United States Patent
Wang et al.

(10) Patent No.: US 12,331,171 B2
(45) Date of Patent: Jun. 17, 2025

(54) METHOD FOR PREPARING A SELF-CLEANING TRANSPARENT THERMAL INSULATION NANOCOATING

(71) Applicant: Sambo Group Company Limited, Hong Kong (CN)

(72) Inventors: Xiaowen Wang, Hong Kong (CN); Wai Yip Ko, Hong Kong (CN); John Haozhong Xin, Hong Kong (CN)

(73) Assignee: Sambo Group Technology Limited, Hong Kong (CN)

( * ) Notice: Subject to any disclaimer, the term of this patent is extended or adjusted under 35 U.S.C. 154(b) by 93 days.

(21) Appl. No.: 18/230,140

(22) Filed: Aug. 3, 2023

(65) Prior Publication Data
US 2023/0374229 A1   Nov. 23, 2023

(30) Foreign Application Priority Data
Aug. 3, 2022  (CN) .......................... 202210927502.3

(51) Int. Cl.
| | |
|---|---|
| C08J 3/075 | (2006.01) |
| B82Y 30/00 | (2011.01) |
| C03C 17/30 | (2006.01) |
| C08G 65/26 | (2006.01) |
| C08K 3/04 | (2006.01) |
| C08K 3/22 | (2006.01) |
| C08K 5/00 | (2006.01) |

(52) U.S. Cl.
CPC ............... *C08J 3/075* (2013.01); *B82Y 30/00* (2013.01); *C03C 17/30* (2013.01); *C08G 65/2603* (2013.01); *C08K 3/042* (2017.05); *C08K 3/22* (2013.01); *C08K 5/0091* (2013.01); *C03C 2217/258* (2013.01); *C08J 2383/04* (2013.01); *C08K 2003/2237* (2013.01); *C08K 2201/011* (2013.01); *C08K 2201/014* (2013.01)

(58) Field of Classification Search
CPC ........... C08J 3/075; C08K 3/042; C03C 17/30
See application file for complete search history.

(56) References Cited

U.S. PATENT DOCUMENTS

2020/0062661 A1 * 2/2020 Geisler .................. C04B 41/71

* cited by examiner

*Primary Examiner* — Robert A Vetere
(74) *Attorney, Agent, or Firm* — Lei Yu

(57) ABSTRACT

A method for preparing a self-cleaning transparent thermal insulation nanocoating includes steps of (1) preparing an acidic aqueous solution, and adding polyoxyethylene dinonyl phenyl ether and graphene into the acidic aqueous solution; (2) preparing a transparent composite nanosol by adding titanate, zinc alkoxide, ytterbium alkoxide and siloxane into the acid aqueous solution through sol-gel reaction; (3) preparing a primary coating by spraying the transparent composite nanosol onto a glass surface; and (4) spraying a dilute alkaline solution onto the primary coating to condense and crosslink components in the primary coating, so that the self-cleaning transparent thermal insulation nanocoating is in-situ generated.

8 Claims, 1 Drawing Sheet

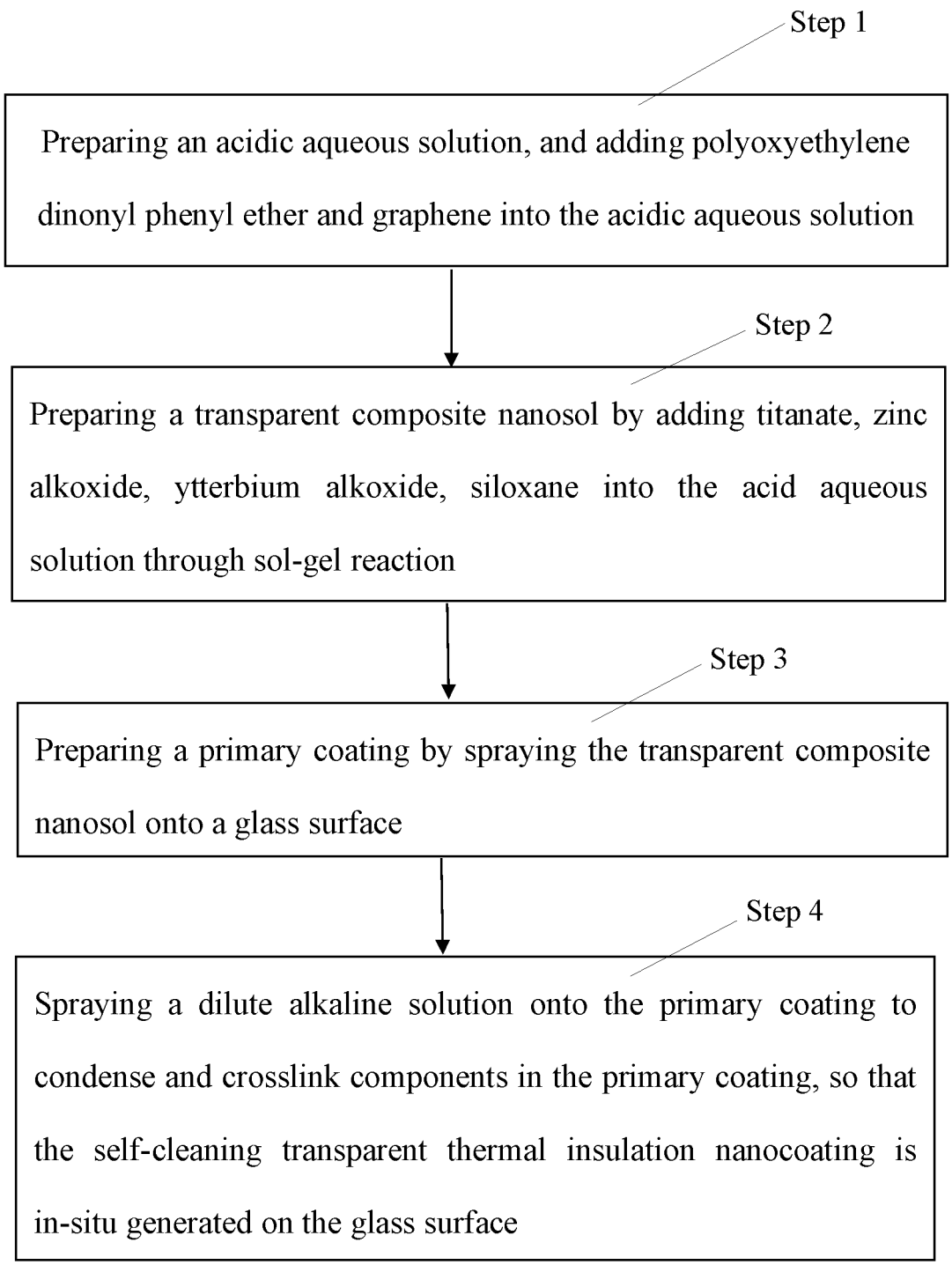

METHOD FOR PREPARING A SELF-CLEANING TRANSPARENT THERMAL INSULATION NANOCOATING

CROSS REFERENCE OF RELATED APPLICATION

The present invention claims priority under 35 U.S.C. 119(a-d) to CN 202210927502.3, filed Aug. 3, 2022.

BACKGROUND OF THE PRESENT INVENTION

Field of Invention

The present invention relates to the field of solar thermal insulation coating technology, and particularly to a method for preparing a self-cleaning transparent thermal insulation nanocoating on the glass surface.

Description of Related Arts

With the long-term use of traditional energy sources such as coal and petroleum, energy shortage and environmental pollution have become two key problems to be solved in the process of today's social development. In addition to stepping up the development of new energy, all world countries are also looking for more effective ways to reduce energy consumption and pollution emissions.

It is well known that strong thermal radiation, especially the infrared radiation part, obviously heats up the buildings and transportations, thereby making the interiors very hot. Air conditioners are most used to overcome heat and make life comfortable. However, the use of air conditioners or cooling devices needs more electrical energy consumption and increases greenhouse gas emissions. Thermal insulation functional materials are able to effectively block the thermal radiation, which are therefore widely used to reduce the load on the air conditioning systems, thereby saving electrical power and reducing carbon emission. How to more conveniently, effectively and durably isolate the thermal radiation of sunlight without reducing the transmittance of glass and other materials has always been a problem that researchers in related fields are trying to solve.

There are two main ways to achieve thermal radiation shielding on glass, especially the Non-Low-E glasses installed on old buildings. One method is to stick a thermal insulation film onto the glass surface, although this film has a certain degree of heat insulation, but it also has many shortcomings, such as the low visible light transmittance, cracking, blistering and even detaching because of aging, expensive but short service life. volatile organic compounds (VOCs) releasing issue because of the plastic films themselves and the adhesives used. Moreover, the waste films are difficult to degrade, further causing environmental pollution.

The other method is to make a thermal insulation coating on the glass surface. The coating is generally made in such a way that the powders of insulation materials are dispersed in a polymer resin first and then coated onto the glass surface, with a subsequent drying step. U.S. Pat. No. 2005/0126441 A1 discloses a composition for a thermal insulation coating system (paint) which comprises two or more materials, such as infrared reflective pigments, low thermal conductivity hollow micro-spheres made of glass, ceramic material or organic polymer and combination with a polymeric binder. The coating is produced by brush, spray, or electrostatic technique.

U.S. Pat. No. 5,540,998 discloses a solar heat-shielding coating composition which consists mainly of two kinds or more of pigments selected from red, orange, yellow, green, blue and purple pigments in such a manner as to yield a color of low lightness, particularly achromatic black, by additive mixture and a weather-resistant vehicle and a structure covered with the coating composition, with the composition capable of covering the outside of the structure exposed directly to the sun and suppressing a rise in the inside temperature.

U.S. Pat. No. 6,673,427 discloses a transparent substrate stacked with multilayer thin films structure, for effecting blocking of IR radiations but transmission of visible radiation. This effectively blocks solar thermal load but needs expensive manufacturing equipment to deposit thin film multilayer.

U.S. Pat. No. 2003/0092815 A1 discloses a functional pigment or pigment mixture which is able to be applied to a transparent medium comprising multilayer pigments; or dry form to a substrate, for example a thermoplastic, the substrate is then melted, and the pigment is homogeneously distributed in the transparent medium; or mixed with the glass or ceramic frits under mild conditions, the powder mixture is applied to a substrate and baked under 150 to 1100° C. for from 5 to 60 min.

U.S. Pat. No. 20110024667 discloses a polymer dispersion of powders based on tungsten hydrogen bronze, especially containing a minor amount of tungsten metal, showing good IR absorbing and heat shielding properties. The powders may be obtained by contacting an ammonium tungstate with hydrogen at a temperature of 2500 K or more, e.g., in a plasma.

Through the existing reports of research papers and patents, it is able to be seen that it is mainly to disperse thermal insulating powders such as tin dioxide antimony (ATO), indium tin oxide (ITO) or lanthanum hexaboride ($LaB_6$) into polymeric resins (e.g., waterborne polyurethane WPU). This mixture is then applied to the glass surface to form a thermal insulation coating. Although this technology has been well developed, the market has not yet had a high acceptance of this type of product, and its application is still limited. The main reasons are as follows: first, these powder materials themselves have inherent colors, which will affect the appearance and transmittance of glass; second, these heavy metal oxide powder materials are easy to agglomerate, difficult to be uniformly dispersed; their densities are different from resin, resulting in precipitation and poor dispersion stability, will form obvious "tumor points" on the final coating, the uniformity is difficult to control too; third, the hardness, aging resistance, abrasion resistance, water resistance and other properties of this resin coating are poor. In particular, the aging resistance, because the inorganic powder material absorbs infrared rays, resulting in a significant increase in the temperature of the coating itself, and the resin in the coating is more prone to slow thermal aging. In addition, if the coating is applied on the external side of the glass, will more easily result in cracks, blisters, and even delamination, the service life is further shortened. Therefore, it is necessary to develop a new, transparent thermal insulation coating with better effect and higher durability.

SUMMARY OF THE PRESENT INVENTION

It is necessary to provide a method for preparing a self-cleaning transparent thermal insulation nanocoating in view of the above shortcomings. The self-cleaning transparent thermal insulation nanocoating prepared by this method has excellent thermal insulation efficiency, visible light transmittance and self-cleaning ability, as well as high durability. This thermal insulation nanocoating is able to be widely used on the glass materials of buildings and transportations to reduce the load on air conditioning systems, thereby saving electrical power and reducing carbon emission. Therefore, it has great economic, social and environmental value.

Accordingly, the present invention provides a method for preparing a self-cleaning transparent thermal insulation nanocoating, the method comprises steps of:

(1) preparing an acidic aqueous solution, and adding polyoxyethylene dinonylphenyl ether and graphene into the acidic aqueous solution;

(2) preparing a transparent composite nanosol by adding titanate, zinc alkoxide, ytterbium alkoxide and siloxane into the acidic aqueous solution through sol-gel reaction;

(3) preparing a primary coating by spraying the transparent composite nanosol onto a glass surface; and (4) spraying a dilute alkaline solution onto the primary coating to condense and crosslink components in the primary coating, so that the self-cleaning transparent thermal insulation nanocoating is in-situ generated on the glass surface.

Preferably, in the acidic aqueous solution, the polyoxyethylene dinonyl phenyl ether accounts for 0.05-0.1%, the graphene accounts for 0.001-0.01%, the titanate accounts for 2-3%, the zinc alkoxide accounts for 0.5-2%, the ytterbium alkoxide accounts for 0.5-2%, the siloxane accounts for 1-3% by weight, and the rest is water.

Preferably, the titanate is at least one member selected from a group consisting of ethyl titanate, butyl titanate and tetraisopropyl titanate; the zinc alkoxide is at least one member selected from a group consisting of 2-methoxyethoxyzinc, diisopropoxyzinc and diethoxyzinc; the ytterbium alkoxide is ytterbium(III) isopropoxide; the siloxane is at least one member selected from a group consisting of tetraethoxysilane, tetramethoxysilane, and 3-(2, 3-epoxypropoxy) propyltrimethoxysilane.

Preferably, the graphene is acidified monolayer graphene which has a transverse size in a range of 100-400 nm.

Preferably, the acidic aqueous solution is prepared by diluting at least one member selected from a group consisting of acetic acid, hydrochloric acid and nitric acid with distilled water, and a pH (potential of hydrogen) value of the acidic aqueous solution is in a range of 1-3

Preferably, the dilute alkaline solution is obtained by diluting at least one member selected from a group consisting of sodium hydroxide, potassium hydroxide and aqueous ammonia with distilled water, and a pH value of the dilute alkaline solution is in a range of 10-12.

Preferably, the step (2) is performed at 50-90° C. for 4-6 h, and continuous stirring is performed during a reaction process.

Preferably, in the steps (3) and (4), spraying is performed with an electric nano-atomizing spray gun, a spraying distance is in a range of 10-30 cm, and a spraying amount is in a range of 30-50 g of liquid per square meter.

The method for preparing the self-cleaning transparent thermal insulation nanocoating disclosed by the present invention is to hydrolyze the precursors such as titanate, zinc alkoxide, ytterbium alkoxide and siloxane, and a composite nanocoating with titanium dioxide, zinc oxide, ytterbium oxide and polysiloxane is finally in-situ formed on the glass surface via a subsequent condensation process. The purpose of thermal insulation and ultraviolet shielding is achieved by the infrared absorbing and ultraviolet blocking function of the nano oxides and the quantum synergistic effect of graphene; the polysiloxane and titanium dioxide composite coating with rich hydroxyl groups has excellent hydrophilicity, which is beneficial to the wetting of natural rainwater and the automatic cleaning of the glass surface; the composite nanocoating containing graphene also has an antistatic effect, is able to reduce the adsorption of dust; combined with the super-hydrophilic and easy-cleaning characteristics, the coated surface is able to significantly reduce cleaning processes and water; the composite nanocoating is in-situ generated and crosslinked on the treated glass surface, which has better uniformity, compactness and stronger adhesion, thus resistant to scrubbing; the composite nanocoating is an inorganic self-crosslinked system, which does not use easy-aging resins, adhesives or polymer films, and has longer service life.

BRIEF DESCRIPTION OF THE DRAWINGS

The drawing is a flowchart of a method for preparing a self-cleaning transparent thermal insulation nanocoating provided by the present invention.

DETAILED DESCRIPTION OF THE PREFERRED EMBODIMENT

In order to make the above objects, features and advantages of the present invention more obvious and easier to understand, the present invention is further explained detailedly in combination with embodiments and drawings as follows. In the following description, many specific details are elaborated to fully understand the present invention. However, the present invention is able to be implemented in many other ways different from those described herein, and those skilled in the art may make similar improvements without departing from the spirit and scope of the present invention, so the present invention is not limited by the specific embodiments disclosed below.

The present invention discloses a method for preparing a self-cleaning transparent thermal insulation nanocoating. The method comprises steps of preparing a transparent composite nanosol by hydrolyzing titanate, zinc alkoxide, ytterbium alkoxide and siloxane in an acidic aqueous solution, wherein the titanate, zinc alkoxide, ytterbium alkoxide and siloxane act as precursors, a small amount of graphene acts as an additive, polyoxyethylene dinonyl phenyl ether acts as a stabilizer; evenly spraying the prepared nanosol onto a glass surface; naturally drying; and then spraying a thin layer of dilute alkaline solution onto the glass surface coated with the nanosol for further condensation and crosslinking, so that a dense transparent thermal insulation nanocoating is in-situ generated on the glass surface. This transparent thermal insulation nanocoating has excellent thermal insulation efficiency, UV (ultraviolet) blocking and self-cleaning ability, as well as high durability. It is able to be widely used on the glass materials of buildings and transportations to reduce the load on air conditioning systems, thereby saving electrical power and reducing carbon emission. Therefore, it has great economic, social and environmental value.

When preparing the self-cleaning transparent thermal insulation nanocoating by the above method, traditional heavy metal powder materials such as ATO, ITO or $LaB_6$ with inherent colors are not adopted, so that the transparency of the nanocoating is quite better and the agglomeration issue of nanoparticles is also effectively avoided. The materials used in the present invention are environmentally friendly and safe; the treatment process and condition are also very simple, just two simple spraying and drying processes under ambient temperature, especially suitable for large-scale applications. The crosslinked transparent nanocoating has excellent adhesion, thermal insulation property, UV-blocking ability, hydrophilic and easy-cleaning performance. In addition, the nanometer titanium dioxide and nanometer zinc oxide in the coating also have the photocatalytic self-cleaning ability, are able to decompose organic stains and microorganisms on the glass surface under light. The nanocoating prepared in the present invention has excellent visible light transmittance, thermal insulation efficiency, durability and self-cleaning ability, so as to achieve the purpose of energy saving, water saving, carbon reduction and environmental protection.

Specifically, referring to the drawing, the method for preparing the self-cleaning transparent thermal insulation nanocoating according to the preferred embodiment of the present invention comprises steps of:

(1) preparing an acidic aqueous solution, adding polyoxyethylene dinonyl phenyl ether and graphene into the acidic aqueous solution, and stirring for a period of time to mix the polyoxyethylene dinonyl phenyl ether and graphene in the acidic aqueous solution uniformly, wherein:

in the present embodiment, the acidic aqueous solution is prepared by diluting at least one member selected from a group consisting of acetic acid, hydrochloric acid and nitric acid with distilled water, and a pH (potential of hydrogen) value of the acidic aqueous solution is in a range of 1-3;

further, in the present embodiment, the graphene is acidified monolayer graphene which has a transverse size in a range of 100-400 nm, and a molecular formula of the polyoxyethylene dinonyl phenyl ether is $C_{25}H_{44}O_6$;

(2) preparing a transparent composite nanosol by adding titanate, zinc alkoxide, ytterbium alkoxide and siloxane into the acidic aqueous solution through sol-gel reaction after stirring in the step (1), wherein:

in the present embodiment, the titanate is at least one member selected from a group consisting of ethyl titanate, butyl titanate and tetraisopropyl titanate; the zinc alkoxide is at least one member selected from a group consisting of 2-methoxyzinc, diisopropoxyzinc, and diethoxyzinc; the ytterbium alkoxide is ytterbium(III) isopropoxide; the siloxane is at least one member selected from a group consisting of tetraethoxysilane, tetramethoxysilane, and 3-(2,3-epoxypropoxy) propyltrimethoxysilane;

further, in the acidic aqueous solution, the polyoxyethylene dinonyl phenyl ether accounts for 0.05-0.1%, the graphene accounts for 0.001-0.01%, the titanate accounts for 2-3%, the zinc alkoxide accounts for 0.5-2%, the ytterbium alkoxide accounts for 0.5-2%, the siloxane accounts for 1-3% by weight, and the rest is water;

the purpose of steps (1) and (2) is to prepare a transparent composite nanosol by a low-temperature one-bath sol-gel technology; in the present embodiment, the raw materials are first dispersed in water, and an acidic environment is provided, the precursors such as titanate, zinc alkoxide, ytterbium alkoxide and siloxane are hydrolyzed in this acidic aqueous solution, so that alkoxy active monomers such as hydroxytitanium, hydroxyzinc, ytterbium hydroxy, hydroxysilane are generated, and each precursor is hydrolyzed according to a general formula of:

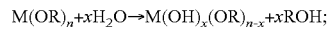

the polyoxyethylene dinonyl phenyl ether acts as a stabilizer to ensure the stability of the hydrolysate, the step (2) is performed at 50-90° C. for 4-6 h, continuous stirring is performed during the reaction process, so that the precursors are fully hydrolyzed;

(3) preparing a primary coating which comprises spraying the transparent composite nanosol onto a glass surface and then naturally drying; and (4) spraying a dilute alkaline solution onto the primary coating to condense and crosslink components in the primary coating, so that the self-cleaning transparent thermal insulation nanocoating is in-situ generated on the glass surface, wherein the step (4) is designed to condense the active monomers in the primary coating under alkaline conditions, the active monomers perform a condensation reaction according to a general formula of:

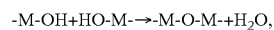

that is, the alkoxy active monomers such as hydroxytitanium, hydroxyzinc, ytterbium hydroxy and hydroxysilane, are polycondensed under alkaline conditions to form polycondensates such as titanium oxide, zinc oxide, ytterbium oxide and silicon oxide, after further drying and dehydration, a transparent nanocomposite film with titanium oxide, zinc oxide, yttrium(III) oxide and silicon oxide is formed.

In the present embodiment, the dilute alkaline solution is obtained by diluting at least one member selected from a group consisting of sodium hydroxide, potassium hydroxide and aqueous ammonia with distilled water, and the pH value of the dilute alkaline solution is in a range of 10-12. Further, in the steps (3) and (4), spraying is performed with an electric nano-atomizing spray gun, a spraying distance is in a range of 10-30 cm, and a spraying amount is in a range of 30-50 g of liquid per square meter.

The purpose of the steps (3) and (4) is to spray the glass surface using the composite nanosol prepared by the steps (1) and (2), thus completing in-situ condensation on the substrate surface.

The process of preparing the self-cleaning transparent thermal insulation nanocoating is further explained in combination with embodiments as follows.

First Embodiment

Adjust the pH value of 500 ml of distilled water to 1 with a mixture of hydrochloric acid and acetic acid at room temperature; disperse 0.3 g of polyoxyethylene dinonyl phenyl ether and 10 mg of acidified monolayer graphene in the acid solution; evenly stir for a period of time; add 12 g of tetraisopropyl titanate, 6 g of diethoxyzinc, 6 g of ytterbium(III) isopropoxide, and 10 g of tetraethoxysilane dropwise while stirring; after completing the adding, continuously stir at 50-90° C. for 4-6 h, to obtain a transparent composite nanosol.

Put the obtained transparent composite nanosol into an electric nano-atomizing spray gun, spray evenly onto a previously cleaned transparent glass with a thickness of 5 mm at a distance in a range of 10-30 cm, naturally dry to obtain a primary coating, spray a layer of dilute aqueous ammonia with a pH value in a range of 10-12 onto the primary coating, and then dry for 6-12 h under ambient temperature.

Second Embodiment

Adjust the pH value of 500 ml of distilled water with nitric acid to 1 at room temperature; add 0.5 g of polyoxyethylene dinonyl phenyl ether and 10 mg of acidified monolayer graphene; stir evenly for a period of time; add 15 g of ethyl titanate, 9 g of 2-methoxyethoxyzinc, 6 g of ytterbium (III) isopropoxide, 8 g of tetraethoxysilane and 4 g of 3-(2,3-epoxypropoxy) propyltrimethoxysilane dropwise while stirring; after completing the adding, continuously stir at 50-90° C. for 4-6 h, to obtain a transparent composite nanosol.

Put the obtained transparent composite nanosol into an electric nano-atomizing spray gun, spray evenly onto a previously cleaned transparent glass with a thickness of 5 mm at a distance of 10-30 cm, naturally dry to obtain a primary coating, spray a layer of dilute sodium hydroxide solution with a pH value in a range of 10-12 onto the primary coating, and then dry for 6-12 h under ambient temperature.

As shown in table 1, the performance test of the glass treated by the method according to the first and second embodiments is obtained as follows.

TABLE 1

The test results of the performance of treated and untreated glass

| Items | Visible light transmittance (%) | IR isolation rate (%) | UV isolation rate (%) | Water contact angle (°) | Coating hardness (H) |
|---|---|---|---|---|---|
| Control Group | 88 | 26 | 28 | 5 | N/A |
| First Embodiment | 82 | 85 | 92 | 0 | 4 |
| Second Embodiment | 80 | 90 | 99 | 0 | 4 |

It is able to be seen that in the first embodiment, the visible light transmittance of the treated glass is measured to be 82% (keep 93% transparency of the original uncoated glass), the IR isolation rate is 85%, the UV isolation rate is 92%, the water contact angle is 0°, and the coating hardness is 4 H. In the second embodiment, the visible light transmittance of the treated glass is measured to be 80% (keep 91% transparency of the original uncoated glass), the IR isolation rate is 90%, the UV isolation rate is 99%, the water contact angle is 0°, and the coating hardness is 4 H.

Take a cleaning blank glass (original uncoated glass without thermal insulation coating) as a control group, when comparing with the blank glass, the tested temperature difference of the glass treated by the method according to the first embodiment under simulated sunlight infrared radiation is 7° C., and after 480 hours of artificial accelerated aging test, the appearance and color of the coating have no change; the tested temperature difference of the glass treated by the method according to the second embodiment under simulated sunlight infrared radiation is 9° C., and after 480 hours of artificial accelerated aging test, the appearance and color of the coating did not change too.

In the preparation method of the self-cleaning transparent thermal insulation nanocoating disclosed by the present invention, a nanocomposite coating with titanium dioxide, zinc oxide, ytterbium oxide and polysiloxane is finally in-situ formed on the glass surface via the hydrolyzation and subsequent condensation of the precursors such as titanate, zinc alkoxide, ytterbium alkoxide and siloxane. The purpose of thermal insulation and ultraviolet shielding is achieved by the infrared absorbing and ultraviolet blocking function of the nano oxides and the quantum synergistic effect of graphene; the polysiloxane and titanium dioxide in the composite nanocoating with rich hydroxyl groups has excellent hydrophilicity, which is beneficial to the wetting of natural rainwater and the automatic cleaning of the glass surface; the composite nanocoating containing graphene and other semiconductors also has antistatic ability, is able to reduce the adsorption of dust; combined with the superhydrophilic property, the coated surface is able to be self-cleaned, which significantly reduces cleaning processes and water; the composite nanocoating is in-situ generated and crosslinked on the treated glass surface, has better uniformity, compactness and adhesion, thus resistant to scrubbing; the composite nanocoating is an inorganic self-crosslinked system, which does not use easy-aging resins, adhesives or polymer films, and has longer service life.

The technical features of the embodiments mentioned above are able to be combined arbitrarily. To make the description concise, not all possible combinations of the technical features in the above embodiments are described. However, as long as there is no contradiction in the combination of these technical features, the combination of these technical features should be considered as within the scope of the present specification.

The embodiments mentioned above only several implementation modes of the present invention, and the descriptions thereof are relatively specific and detailed, but should not be construed as limiting the protection scope of the present invention. It should be pointed out that those skilled in the art are able to make several modifications and improvements without departing from the spirit of the present invention, and these modifications and improvements all belong to the protection scope of the present invention. Therefore, the protection scope of the present invention should be based on the claims.

What is claimed is:

1. A method for preparing a self-cleaning transparent thermal insulation nanocoating, the method comprising steps of:
   (1) preparing an acidic aqueous solution, and adding polyoxyethylene dinonyl phenyl ether and graphene into the acidic aqueous solution;
   (2) preparing a transparent composite nanosol by adding titanate, zinc alkoxide, ytterbium alkoxide, siloxane into the acid aqueous solution through sol-gel reaction;
   (3) preparing a primary coating by spraying the transparent composite nanosol onto a glass surface; and
   (4) spraying a dilute alkaline solution onto the primary coating to condense and crosslink components in the primary coating, so that the self-cleaning transparent thermal insulation nanocoating is in-situ generated on the glass surface.

2. The method according to claim 1, wherein in the acidic aqueous solution, the polyoxyethylene dinonyl phenyl ether accounts for 0.05-0.1%, the graphene accounts for 0.001-0.01%, the titanate accounts for 2-3%, the zinc alkoxide accounts for 0.5-2%, the ytterbium alkoxide accounts for 0.5-2%, the siloxane accounts for 1-3% by weight, and the rest is water.

3. The method according to claim 1, wherein the titanate is at least one member selected from a group consisting of ethyl titanate, butyl titanate and tetraisopropyl titanate; the zinc alkoxide is at least one member selected from a group consisting of 2-methoxyethoxyzinc, diisopropoxyzinc and diethoxyzinc; the ytterbium alkoxide is ytterbium(III) isopropoxide; the siloxane is at least one member selected from a group consisting of tetraethoxysilane, tetramethoxysilane, and 3-(2, 3-epoxypropoxy) propyltrimethoxysilane.

4. The method according to claim 1, wherein the graphene is acidified monolayer graphene which has a transverse size in a range of 100-400 nm.

5. The method according to claim 1, wherein the acidic aqueous solution is prepared by diluting at least one member selected from a group consisting of acetic acid, hydrochloric acid and nitric acid with distilled water, and a pH (potential of hydrogen) value of the acidic aqueous solution is in a range of 1-3.

6. The method according to claim 1, wherein the dilute alkaline solution is obtained by diluting at least one member selected from a group consisting of sodium hydroxide, potassium hydroxide and aqueous ammonia with distilled water, and a pH value of the dilute alkaline solution is in a range of 10-12.

7. The method according to claim 1, wherein the step (2) is performed at 50-90° C. for 4-6 h, and continuous stirring is performed during a reaction process.

8. The method according to claim 1, wherein in the steps (3) and (4), spraying is performed with an electric nano-atomizing spray gun, a spraying distance is in a range of 10-30 cm, and a spraying amount is in a range of 30-50 g of liquid per square meter.

* * * * *